(12) United States Patent
Eden et al.

(10) Patent No.: US 8,497,631 B2
(45) Date of Patent: Jul. 30, 2013

(54) POLYMER MICROCAVITY AND MICROCHANNEL DEVICES AND FABRICATION METHOD

(75) Inventors: J. Gary Eden, Mahomet, IL (US); Sung-Jin Park, Champaign, IL (US); Meng Lu, Urbana, IL (US); Brian Cunningham, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 916 days.

(21) Appl. No.: 11/698,264

(22) Filed: Jan. 23, 2007

(65) Prior Publication Data
US 2007/0200499 A1    Aug. 30, 2007

Related U.S. Application Data

(60) Provisional application No. 60/761,316, filed on Jan. 23, 2006.

(51) Int. Cl.
*H01J 17/49*    (2012.01)

(52) U.S. Cl.
USPC .......................................... 313/586; 313/567

(58) Field of Classification Search
USPC .......................................... 313/582–587, 609
See application file for complete search history.

(56) References Cited

U.S. PATENT DOCUMENTS

| 3,767,968 | A |   | 10/1973 | Ogle |
| 3,848,248 | A | * | 11/1974 | MacIntyre, Jr. ................. 345/60 |
| 3,908,147 | A |   | 9/1975  | Hall et al. |
| 4,603,061 | A |   | 7/1986  | St. Clair et al. |
| 5,336,121 | A |   | 8/1994  | Baret |
| 5,853,446 | A |   | 12/1998 | Carre et al. |
| 6,016,027 | A |   | 1/2000  | DeTemple et al. |
| 6,023,130 | A | * | 2/2000  | Sakasegawa et al. ......... 313/582 |
| 6,078,379 | A |   | 6/2000  | Nagae et al. |
| 6,139,384 | A |   | 10/2000 | DeTemple et al. |
| 6,194,833 | B1|   | 2/2001  | DeTemple et al. |

(Continued)

FOREIGN PATENT DOCUMENTS

| EP | 1486775  | 12/2004 |
| JP | 08106852 | 4/1996 |

(Continued)

OTHER PUBLICATIONS

J.G. Eden et al., "Microplasma Devices Fabricated in Silicon, Ceramic, and Metal/Polymer Structures: Arrays, Emitters and Photodetectors", *J. Phys. D: Appl. Phys.*, vol. 36, 2003, pp. 2869-2877.

(Continued)

*Primary Examiner* — Anh Mai
*Assistant Examiner* — Andrew Coughlin
(74) *Attorney, Agent, or Firm* — Greer, Burns & Crain Ltd.

(57) ABSTRACT

A microplasma device includes a substrate and either or both of a microchannel or microcavity defined in a polymer layer supported by the substrate. Electrodes arranged with respect to the polymer material can excite a plasma in a discharge medium contained in the microchannel or the microcavity or both. A method of forming a microplasma device places a curable polymer material between a mold having a negative volume impression of microcavities and/or microchannels and a substrate. The polymer is cured and then the mold is separated from the solid polymer.

18 Claims, 10 Drawing Sheets

U.S. PATENT DOCUMENTS

| | | | |
|---|---|---|---|
| 6,433,480 | B1 | 8/2002 | Stark et al. |
| 6,517,400 | B1 | 2/2003 | Cho et al. |
| 6,563,257 | B2 | 5/2003 | Park et al. |
| 6,657,370 | B1 | 12/2003 | Geusic |
| 6,867,548 | B2 | 3/2005 | Eden et al. |
| 6,970,219 | B1 | 11/2005 | Hermann |
| 7,112,918 | B2 | 9/2006 | Eden et al. |
| 2003/0057832 | A1* | 3/2003 | Juestel et al. ............... 313/587 |
| 2003/0080664 | A1 | 5/2003 | Eden et al. |
| 2003/0080688 | A1 | 5/2003 | Eden et al. |
| 2003/0094891 | A1* | 5/2003 | Green et al. ............... 313/495 |
| 2003/0132693 | A1 | 7/2003 | Eden et al. |
| 2004/0058537 | A1 | 3/2004 | Yanagita et al. |
| 2004/0100194 | A1 | 5/2004 | Eden et al. |
| 2004/0160162 | A1 | 8/2004 | Eden et al. |
| 2004/0160187 | A1* | 8/2004 | Yao ............... 313/609 |
| 2004/0206959 | A1 | 10/2004 | Heeger et al. |
| 2005/0148270 | A1 | 7/2005 | Eden et al. |
| 2005/0253290 | A1 | 11/2005 | Yokoyama et al. |
| 2005/0285523 | A1 | 12/2005 | Fujitani |
| 2006/0082319 | A1 | 4/2006 | Eden et al. |
| 2006/0084262 | A1 | 4/2006 | Qin |
| 2006/0121815 | A1 | 6/2006 | Kim et al. |
| 2007/0108910 | A1 | 5/2007 | Eden et al. |
| 2007/0114929 | A1 | 5/2007 | Son |
| 2007/0170866 | A1 | 7/2007 | Eden et al. |
| 2007/0200499 | A1 | 8/2007 | Eden et al. |

FOREIGN PATENT DOCUMENTS

| | | |
|---|---|---|
| JP | 09245655 | 9/1997 |
| JP | 10-101373 | 4/1998 |
| JP | 10-237197 | 9/1998 |
| JP | 2000-067756 | 3/2000 |
| JP | 2001-135241 | 5/2001 |
| JP | 3270045 | 1/2002 |
| JP | 2003-282010 A | 10/2003 |
| JP | 2004-272199 | 9/2004 |
| KR | 10-2001-0076293 | 12/2001 |
| WO | WO 2004/032176 | 4/2004 |

OTHER PUBLICATIONS

S.J. Park et al., "Flexible Microdischarge Arrays: Metal/Polymer Devices", vol. 77, No. 2, Jul. 10, 2000, pp. 199-201.

S.J. Park et al., "Performance of Microdischarge Devices and Arrays with Screen Electrodes", *IEEE Photonics Technology Letters*, vol. 13, No. 1, Jan. 201, pp. 61-63.

S.O. Kim, J.G. Eden, "Arrays of Microplasma Devices Fabricated in Photodefinable Glass and Excited AC or DC by Interdigitated Electrodes", *IEEE Photon. Technol. Lett*, vol. 17, 2005, p. 1543.

M.J. Kushner, "Modeling of microdischarge device: Pyramidal structures", *J. App. Phys.*, vol. 95, 2004, p. 846.

S.J. Park, K.F. Chen, N.P. Ostrom, J.G. Eden, "40 000 pixel arrays of ac-excited silicon microcavity plasma devices", *Appl. Phys. Lett.*, vol. 86, 2005, pp. 111501.

P.S. von Allmen, S.T. McCain, N.P. Ostrom, B.A. Vojak, J.G. Eden, F. Zenhausern, C. Jensen, M. Oliver, "Ceramic microdischarge arrays with individually ballasted pixels", *Appl. Phys. Lett.*, vol. 82, 2003, pp. 2562.

Sung-Jin Park, Jack Chen, Clark J. Wagner, Nels P. Ostrom, Chang Liu, J. Gary Eden, "Microdischarge Arrays: A New Family of Photonic Devices", *IEEE Journal on Selected Topics in Quantum Electronics*, vol. 8, No. 1, Jan./Feb. 2002, pp. 139-147.

Bender, M. et. al., "High resolution lithography with PDMS Molds", *J. Vac. Sci. Technoi. B*, vol. 22; No. 6, pp. 3329-3232, Dec. 10, 2004.

Office Action dated Jan. 27, 2011 from European Application No. 07 762 516.8, J. Gary Eden.

\* cited by examiner

POLYMER MICROCAVITY AND MICROCHANNEL DEVICES AND FABRICATION METHOD

PRIORITY CLAIM

This application claims priority under 35 U.S.C. §119 from co-pending provisional application Ser. No. 60/761,316, filed Jan. 23, 2006.

STATEMENT OF GOVERNMENT INTEREST

This invention was made with government support under contract number F49620-03-1-0391 awarded by the Air Force Office of Scientific Research (AFOSR). The government has certain rights in this application.

FIELD OF THE INVENTION

The present invention relates to microcavity plasma devices, also known as microdischarge or microplasma devices.

BACKGROUND

Microcavity plasmas, plasmas confined to a cavity with a characteristic spatial dimension <1 mm, have several distinct advantages over conventional, macroscopic discharges. For example, the small physical dimensions of microcavity plasma devices allow them to operate at gas or vapor pressures much higher than those accessible to a macroscopic discharge such as that produced in a fluorescent lamp. When the diameter of the microcavity is, for example, on the order of 200-300 µm or less, the device is capable of operating at pressures as high as atmospheric pressure and beyond. In contrast, standard fluorescent lamps operate at pressures typically less than 1% of atmospheric pressure. Also, microplasma devices may be operated with different discharge media (gases, vapors or combinations thereof) to yield emitted light in the visible, ultraviolet, and infrared portions of the spectrum. Another unique feature of microplasma devices, the large power deposition into the plasma (typically tens of kW/cm$^3$ or more), is partially responsible for the efficient production of atoms and molecules that are well-known optical emitters. Consequently, because of the properties of microplasma devices, including the high pressure operation mentioned above and their electron and gas temperatures, microplasmas are efficient sources of optical radiation.

Microcavity plasma devices have been developed over the past decade for a wide variety of applications. An exemplary application for an array of microplasmas is in the area of displays. Since single cylindrical microplasma devices, for example, with a characteristic dimension (d) as small as 10 µm have been demonstrated, devices or groups of devices offer a spatial resolution that is desirable for a pixel in a display. In addition, the efficiency for generating, with a microcavity plasma device, the ultraviolet light at the heart of the plasma display panel (PDP) significantly exceeds that of the discharge structure currently used in plasma televisions.

Early microplasma devices were driven by direct current (DC) voltages and exhibited short lifetimes for several reasons, including sputtering damage to the metal electrodes. Improvements in device design and fabrication have extended lifetimes significantly, but minimizing the cost of materials and the manufacture of large arrays continue to be key considerations. Also, more recently-developed microplasma devices excited by a time-varying voltage are preferable when lifetime is of primary concern.

Microcavity plasma devices have been made in a variety of materials, including molybdenum, ceramics, silicon, and polymer/metal film structures. Microcavities have been made by a variety of techniques, including etching, mechanical drilling and laser ablation. Each of these fabrication techniques has one or more drawbacks. For example, with laser ablation and mechanical drilling, the size of the microcavity is typically limited to about 50 µm, with smaller sizes more difficult to make. Additionally, the cross-sections of microcavities formed by ablation and drilling methods are not completely uniform. In the case of drilling, mechanical wear of drill bits and mechanical tolerances prevent the achievement of accurate dimensional control and repeatability. Also, the serial nature of the cavity drilling procedure makes the time and cost of processing prohibitive for the production of large arrays of microcavity plasma devices. Another drawback is that the techniques used for microcavity formation are not readily adaptable to produce other features, e.g., channels.

Research by the present inventors and colleagues at the University of Illinois has pioneered and advanced the state of microcavity plasma devices. This work has resulted in practical devices with one or more important features and structures. Most of these devices are able to operate continuously with power loadings of tens of kW-cm$^{-3}$ to beyond 100 kW-cm$^{-3}$. One such device that has been realized is a multi-segment linear array of microplasmas designed for pumping optical amplifiers and lasers. Also, the ability to interface a gas (or vapor) phase plasma with the electron-hole plasma in a semiconductor has been demonstrated. Fabrication processes developed largely by the semiconductor and micro-electromechanical systems (MEMs) communities have been adopted for fabricating many of these microcavity plasma devices.

Use of silicon integrated circuit fabrication methods has further reduced the size and cost of microcavity plasma devices and arrays. Because of the batch nature of micromachining, not only are the performance characteristics of the devices improved, but the cost of fabricating large arrays is also reduced. The ability to fabricate large arrays with precise tolerances and high density makes these devices attractive for display applications. While representing an important step in the development of microdischarge devices, micromachined fabrication approaches also have limitations. One limitation is that the size of an individual array is limited to the size of the silicon substrate. Second, the cost of a device is determined not only by the substrate cost, but also by the cost of performing an expensive series of photolithographic, thin film deposition, and etching steps on each wafer in the batch. Finally, although silicon wafers are a convenient substrate due to the wide range of processing options that are available, silicon is an optically opaque material, and is therefore not suitable for applications such as heads-up displays or applications requiring lateral propagation or coupling of visible light between microcavity plasma devices in an array.

This research by present inventors and colleagues at the University of Illinois has resulted in exemplary practical devices. For example, semiconductor fabrication processes have been adopted to demonstrate densely packed arrays of microplasma devices exhibiting uniform emission characteristics. Arrays fabricated in silicon comprise as many as 250,000 microplasma devices in an active area of 25 cm$^2$, each device in the array having an emitting aperture of typically 50 µm×50 µm. It has been demonstrated that such arrays can be used to excite phosphors in a manner analogous to plasma display panels, but with values of the luminous efficacy that are not presently achievable with conventional plasma display panels. Another important device is a microcavity plasma photodetector that exhibits high sensitivity. Phase locking of microplasmas dispersed in an array has also been demonstrated.

The following U.S. patents and patent applications describe microcavity plasma devices resulting from these research efforts. Published Applications: 20050148270-Microdischarge devices and arrays; 20040160162-Microdischarge devices and arrays; 20040100194-Microdischarge photodetectors; 20030132693-Microdischarge devices and arrays having tapered microcavities; U.S. Pat. No. 6,867,548-Microdischarge devices and arrays; U.S. Pat. No. 6,828,730-Microdischarge photodetectors; U.S. Pat. No. 6,815,891-Method and apparatus for exciting a microdischarge; U.S. Pat. No. 6,695,664-Microdischarge devices and arrays; U.S. Pat. No. 6,563,257-Multilayer ceramic microdischarge device; U.S. Pat. No. 6,541,915-High pressure arc lamp assisted start up device and method; U.S. Pat. No. 6,194,833-Microdischarge lamp and array; U.S. Pat. No. 6,139,384-Microdischarge lamp formation process; and U.S. Pat. No. 6,016,027-Microdischarge lamp.

U.S. Pat. No. 6,541,915 discloses arrays of microcavity plasma devices in which the individual devices are mounted in an assembly that is machined from materials including ceramics. Metallic electrodes are exposed to the plasma medium which is generated within a microcavity and between the electrodes. U.S. Pat. No. 6,194,833 also discloses arrays of microcavity plasma devices, including arrays for which the substrate is ceramic and a silicon or metal film is formed on it. Electrodes disposed at the top and bottom of microcavities contact the discharge medium. U.S. Published Patent Application 20030230983 discloses microcavity plasmas produced in low temperature ceramic structures. The stacked ceramic layers are arranged and micromachined so as to form cavities and intervening conductor layers excite the plasma medium. U.S. Published Patent Application 20020036461 discloses hollow cathode discharge devices in which electrodes contact the plasma/discharge medium.

Microcavity plasma devices have also been fabricated in glass that can be etched by photolithography techniques. See, e.g., Kim, S.-O., and J. G. Eden, IEEE Photon. Technol. Lett. 17, 1543 (2005). As with silicon fabrications, the array size is limited to the size of the substrate and the surface area that can be contiguously patterned by photolithography. Array cost is dominated by the cost of performing multiple photolithography steps.

The development of microcavity plasma devices continues, with an emphasis on the display market and the biomedical applications market. The ultimate utility of microcavity plasma devices in displays will hinge on several critical factors, including efficacy (discussed earlier), lifetime and addressability. Addressability, in particular, is vital in most display applications. For example, for a group of microcavity discharges to comprise a pixel, each microplasma device must be individually addressable.

Current flat panel display solutions suffer from a number of drawbacks. Flat panel display technologies that have been widely adopted include liquid crystal displays (LCDs) and plasma display panels (PDPs). These technologies have been widely adopted for large screen formats such as televisions. LCDs are also used in computer displays. Compact electronic devices such as personal digital assistants (PDA) also benefit from high contrast, bright, high resolution displays.

Plasma display panels are in widespread use as high definition displays. While the basic technology for PDPs dates back to the 1960s, the materials, design, and manufacturing methods developed for plasma displays have evolved over the past two decades to enable the high resolution, long lifetime, and high brightness microplasma arrays for PDPs available today. Individual PDP cells (three cells to a pixel: red, blue, green) tend to have characteristic dimensions (d)>300 µm, and pd (pressure x electrode separation) scaling design rules result in total gas pressures of nominally 400-500 Torr. Consequently, PDPs must be sealed hermetically within an enclosure (normally, glass) that is sufficiently robust (i.e., thick) to withstand atmospheric pressure and this factor is primarily responsible for the undesirably large weight of these displays.

Practical designs that would permit the use of microcavity plasma devices would likely alter the landscape of the flat panel display industry. Compared to standard flat panel display technologies, microplasma devices offer the potential of smaller pixel sizes, for example. Small pixel sizes correlate directly with higher spatial resolution. In addition, tests have shown that microplasma devices convert electrical energy to visible light at a higher efficiency than that available with conventional pixel structures in plasma display panels.

SUMMARY OF THE INVENTION

A microplasma device includes a substrate and either or both of a microchannel or microcavity defined in a polymer layer supported by the substrate. Electrodes arranged with respect to the polymer material can excite plasma in a discharge medium contained in the microchannel or the microcavity or both. A method of forming a microplasma device places a curable polymer material between a mold having a negative volume impression of microcavities and/or microchannels and a substrate. The polymer is cured and then the mold is separated from the solid polymer.

DETAILED DESCRIPTION OF THE PREFERRED EMBODIMENTS

Figure 1:
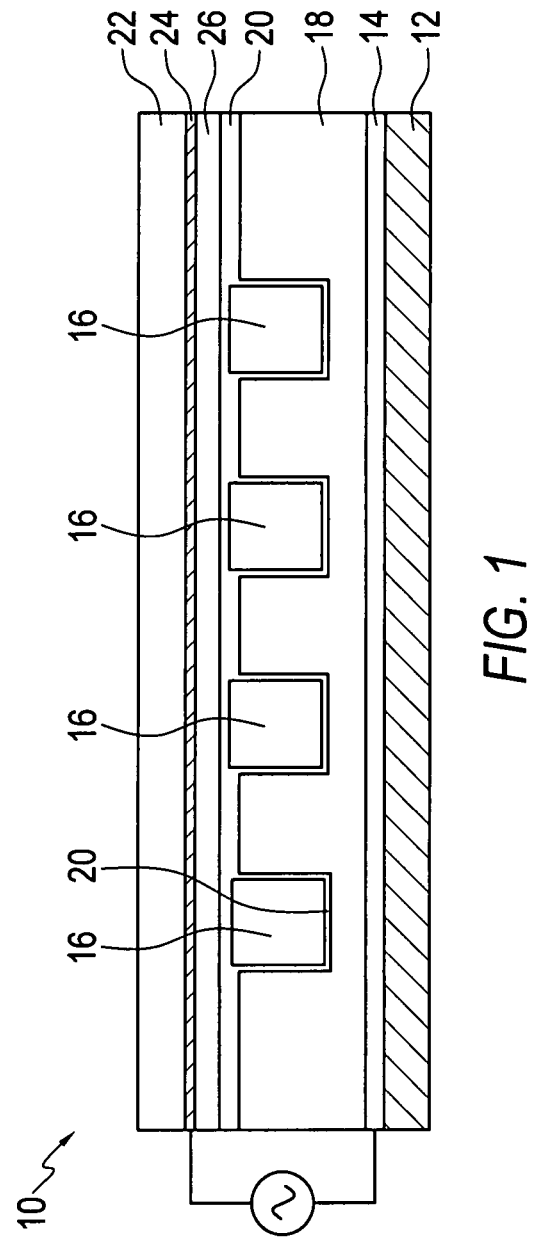
FIG. 1 is a cross-sectional schematic view of a preferred embodiment polymer microcavity plasma device array.

Microcavity plasma device arrays of different embodiments of the invention provide polymer microcavities that are readily mass fabricated, can be transparent, and can be rigid or flexible. A preferred embodiment of the invention is a polymer microcavity plasma array formed on a substrate. In a preferred embodiment, the polymer is a transparent polymer having transparency in a particular range of interest, e.g., such as infrared (IR), visible, ultraviolet (UV) or a range extending to portions of the IR, visible and UV ranges. In preferred embodiments, the transparent polymer is transparent in at least a portion of the visible range. The substrate and electrodes can also be transparent in preferred embodiments. In preferred embodiments, transparent polymer microcavities are formed in a flexible polymer material. In other preferred embodiments, the transparent polymer microcavities are formed in a rigid polymer material. Arrays of the invention can be very large format, as arrays of the invention can be produced by a highly accurate molding process that permits precision replication of microcavities.

Additionally, arrays of the invention can have high aspect ratio microcavities and channels. Microchannels in embodiments of the invention can connect microcavities, and can be formed into patterns having a wide variety of shapes, e.g., straight, zig-zig and other shapes. Very long, high aspect ratio channels can be formed, e.g., a one meter channel that is 20 µm wide.

Another embodiment of the invention is a microchannel plasma device, with long, high aspect ratio optical channels. In a preferred embodiment, an optical microchannel plasma device has thin polymer walls separating microchannels. In a preferred embodiment, the polymer walls are transparent. The device has application, for example, in laser spectroscopy since the channels can be probed with a laser beam while a sample, e.g., chemical products from a plasma reactor, is within the channel.

A preferred fabrication method of the invention molds microcavities into a polymer material. Preferably, the polymer material is transparent. The mold is a negative volume profile of the microcavity shape, which can be, for example, cylindrical, pyramidal, truncated conical in cross-section, or any other shape that can have its negative volume profile formed in the mold. A flexible mold is preferably used to fabricate transparent polymer microcavities onto rigid substrates. A rigid mold is preferably used to fabricate transparent polymer microcavities onto flexible substrates. Having one of the mold and the substrate flexible and the other rigid aids in the separation of the mold from the cured polymer.

In an example embodiment, a mold is used to replicate microcavities in a liquid polymer material that can be cured into the solid state by exposure to UV light. The microcavity formation process is simple, rapid, and highly accurate. Further, the UV-curable polymer replication procedure is capable of producing deep cavities without the use of large forces or high temperatures, such as those required with stamping approaches. Producing microcavities of small transverse dimensions but large aspect ratio is also straightforward and inexpensive.

Microcavity plasma device arrays of different embodiments of the invention provide polymer microcavities that can be transparent, and that can be rigid or flexible. A preferred embodiment of the invention is a polymer microcavity plasma array formed on a substrate. In a particular preferred embodiment, the polymer material is transparent in the visible range and in the near UV range. The substrate and electrodes can also be transparent in preferred embodiments. In preferred embodiments, the transparent polymer microcavities are formed in a flexible polymer material. In other preferred embodiments, the transparent polymer microcavities are formed in a rigid polymer material. Arrays of the invention can be very large format, as arrays of the invention can be produced by a highly accurate molding process that permits precision replication of microcavities.

Microcavity plasma devices of the invention and a method of fabrication of such devices of the invention enable low-cost manufacturing of large arrays of microcavity plasma devices over large surface areas (tens to thousands of square centimeters and larger) on either rigid or flexible substrates. A preferred fabrication method replicates the microcavity shape into a polymer material, e.g. a transparent polymer, through the use of a molding process. In an exemplary embodiment, the mold is a negative volume profile of the desired microcavity shape that is either flexible (for molding of microcavities upon rigid substrates) or rigid (for molding of microcavities upon flexible substrates). In a preferred embodiment, the mold shape is replicated into a liquid polymer material that can be cured into a solid by exposure to UV light. By the preferred process, the cavity formation process is simple, rapid, and highly accurate. Further, the UV-curable polymer replication procedure is capable of producing deep cavities without the use of large forces or high temperatures, such as those required with stamping approaches. Producing microcavities of small transverse dimensions but large aspect ratio is also straightforward and inexpensive. Additionally, large aspect ratio microchannel plasma devices can be produced by preferred methods of the invention.

Preferred embodiments will now be discussed with respect to the drawings. The drawings include schematic figures, which will be fully understood by skilled artisans with reference to the accompanying description. Features may be exaggerated for purposes of illustration. From the preferred embodiments, artisans will recognize broader aspects of the invention.

FIG. 1 is a cross-sectional schematic view of a preferred embodiment polymer microcavity plasma device array 10 of the invention. A substrate 12 is a polymer, for example, a flexible plastic material such as polyester (PET). Other rigid or flexible polymer materials can also be used. Additional example materials include polycarbonate and polymethyl methacrylate (PMMA). The substrate 12 carries a bottom electrode 14.

The bottom electrode 14 can be formed, for example, by a suitable deposition technique and can be patterned in such as way as to enable excitation of individual microcavity plasma devices within the array 10. The bottom electrode 14 can also be a continuous or patterned conductive layer that provides a common electrode for one or more groups of microcavity plasma devices or all of the microcavity plasma devices in the array 10.

In preferred transparent polymer microcavity plasma device arrays, the bottom electrode 14 is transparent in the visible range. For example, the substrate 12 can be coated with a thin film of transparent conducting material, such as Indium Tin Oxide (ITO). Such a transparent conducting material can form the bottom electrode 14 of the microcavity plasma device array 10.

A plurality of microcavities 16 are formed in a polymer layer 18, which is preferably an epoxy layer as the thermosetting properties of epoxy are useful in preferred methods of formation of the microcavities 16 and of microcavity arrays. A dielectric coating 20 preferably is used to protect and insulate the inner surfaces of the microcavities 16 from plasma produced within the microcavities 16. Additionally, the dielectric coating 20 provides a barrier that slows or blocks outgassing vapors from the polymer layer 18 from reaching the microcavities 16. The dielectric coating 20 can be a thin film, for example a thin film of titanium dioxide TiO₂. Other suitable dielectrics include, for example, silicon oxide, tantalum oxide, magnesium oxide and silicon nitride.

The microcavities are sealed by another polymer substrate 22 under pressure with a suitable discharge gas or gas mixture in which plasma can be excited. The substrate 22 carries an upper electrode 24 and is bonded to the polymer layer 18 via a thin adhesive 26, such as a thin layer of epoxy. In preferred embodiments, the material properties and/or thicknesses of the substrates 12 and 22 and other layers in the microcavity plasma device array 10 are selected so that the array is both transparent and flexible.

Figure 2:
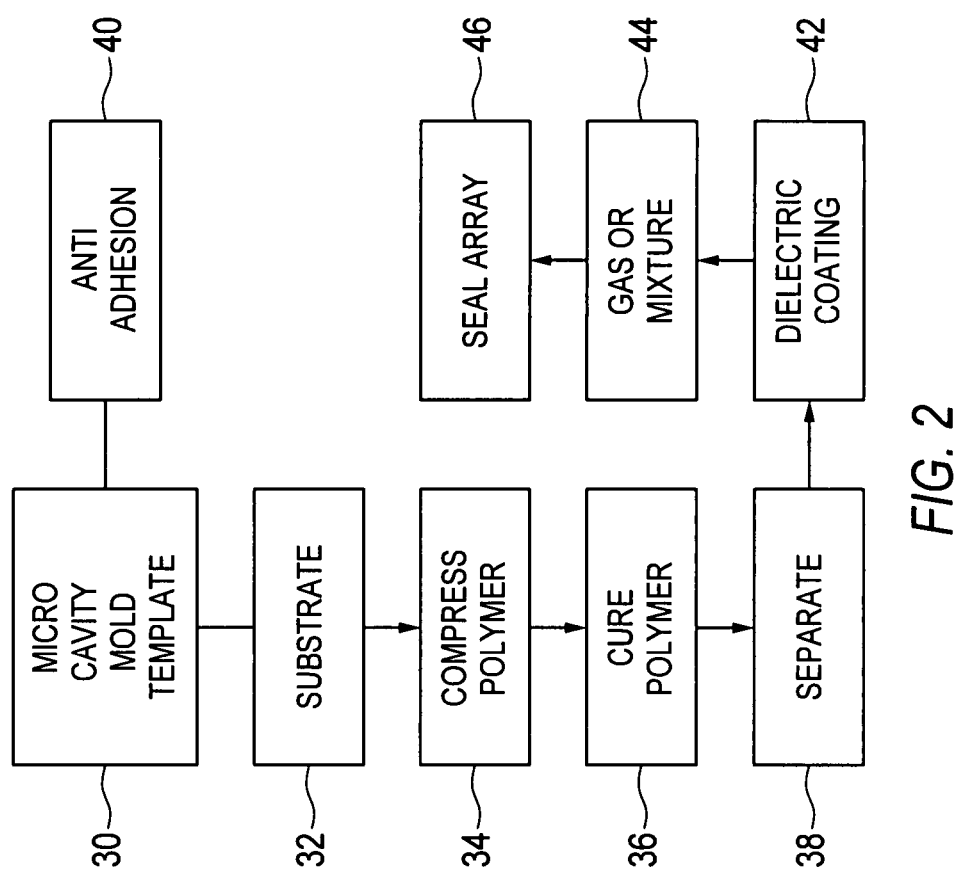
FIG. 2 is a block diagram illustrating a preferred embodiment method for forming a polymer microcavity plasma device array such as the FIG. 1 polymer microcavity plasma device array.

In a preferred fabrication method, shown in FIG. 2, the microcavities 16 are formed in the layer 18 via a micromolding process. A mold is provided 30. The mold contains a negative volume of the desired microcavity shape, which can be, for example cylindrical or pyramidal. A mold can be fabricated by performing conventional photolithography upon a substrate such as silicon, where the mold shape can be etched into the silicon by material removal processes, such as wet chemical etching, reactive ion etching, ion milling, or inductively coupled plasma etching. In general, the mold can be fabricated from any durable material, additional examples of which include glass, ceramic, or metal.

A large number of molds (referred to as daughters) can be produced by using a master for creation, which is useful to create identical molds for high volume manufacturing as repeated use of a mold can lead to wear of the template. A master used to create daughter molds has a positive volume image of the desired microcavity plasma device array shape.

A substrate is provided 32, such as the polymers discussed above, and a layer of liquid, curable polymer material is compressed 34 between the substrate and the mold template. The polymer is then cured 36. The method of curing will depend upon the type of polymer, of course, and may involve heat, time, or exposure to actinic radiation, typically UV radiation.

In a preferred embodiment method of fabrication for UV transparent microcavity plasma device arrays, the polymer is a liquid, UV-curable polymer, which is allowed to flow into the mold when it is compressed between the substrate and the mold template, and is subsequently exposed to high intensity UV illumination that causes the liquid material to cure into a solid. The viscosity of the liquid UV-curable polymer is selected to enable rapid filling of the mold shape without the application of substantial force between the mold and the substrate. The UV-curing process can take place at room temperature, and can be completed in ~10-90 seconds, depending on the polymer material, the curing initiation chemical, and the desired degree of curing.

The substrate provided in step 32 can carry a patterned or non-patterned electrode, such as discussed with respect to the example embodiment microcavity plasma device array 10 in FIG. 1. Then, after the step of curing, the result is that the portion of the layer 18 between the bottom of the microcavities 16 and the bottom electrode 14 is a thin barrier of cured polymer. The thickness of the portion of the layer 18 that is a barrier between the electrode 14 and the microcavities 16 can be accurately controlled by the liquid polymer viscosity, by the temperature of the replication process, and by the pressure applied between the substrate and the mold during replication. The barrier portion of the layer 18 helps to isolate and protect the bottom electrode from exposure to the plasma, and will contribute to the device capacitance.

After curing, the mold and the substrate are separated 38 in a manner such that the cured polymer preferentially adheres to the substrate. Pre-treating the mold with an anti-adhesion coating 40 can aid the step of separation 38. For example, an anti-adhesion monolayer coating, such as Repel Silane (Amersham Biosciences) can be formed on the mold template. An anti-adhesion coating can also be formed, for example by evaporation of a metal thin film (such as gold, silver, or nickel) onto the mold surfaces. Mold separation can also be facilitated if either the mold or the substrate is mechanically flexible, so that the mold and substrate may be peeled away from each other.

Therefore, for replication of polymer microcavities upon rigid substrates such as glass, a flexible mold is preferably used. The flexible mold can be fabricated, for example, from flexible metal foil, flexible elastomers (such as PDMS), or flexible plastic film. The molding process is capable of accurately producing features over a wide range of size scales, from tens of nanometers to hundreds of microns. For fabrication upon flexible substrate materials, the process may be performed in a continuous manner, so that the microcavity plasma device arrays can be produced from continuous rolls of substrate film in a roll-to-roll configuration at rates up to several feet/minute.

Following the separation, the microcavities can be optionally coated 42 with a dielectric material, such as titanium dioxide, silicon oxide, tantalum oxide, magnesium oxide or silicon nitride. As discussed above, the dielectric material serves to protect the polymer cavity from exposure to the plasma, which could result in gradual degradation of microdischarge performance through exposure of the polymer to energetic species such as positive or negative ions. The dielectric material can also be used reduce the rate of outgassing of volatile components within the cured polymer into the sealed cavity. Another potential function of the dielectric (and MgO, in particular) is to provide supplemental electrons to the plasma by secondary emission. Also, the dielectric material is oriented between the upper and bottom electrodes 14 and 24, and its thickness and dielectric constant will contribute to the overall capacitance of the device. A discharge gas or mixture is introduced 44 into the microcavities 16 and then the top substrate/electrode is used to seal 46 the array 10.

Figure 3:
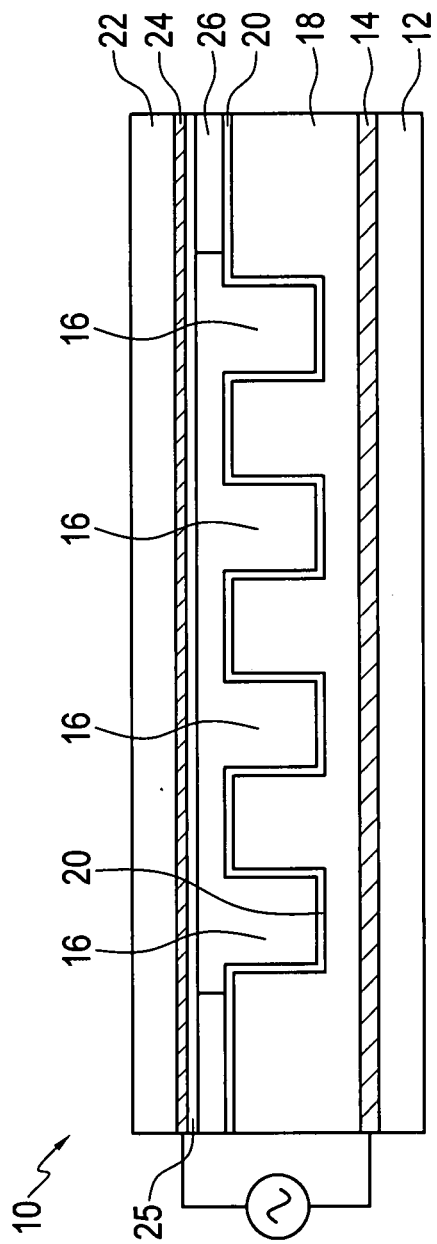
FIG. 3 is a cross-sectional schematic view of another preferred embodiment polymer microcavity plasma device array.

FIG. 3 illustrates another embodiment in which flow of the discharge medium (gas or a gas mixture) is permitted to flow between microcavities 16. In this case, the adhesive 26 is applied around the circumference of the layer 18 permitting flow of the discharge medium among microcavities, and individual cavities are not sealed. An additional dielectric layer 25 protects the upper electrode 24 from plasma. As has been mentioned preferred, embodiments include flexible and transparent arrays. In a preferred transparent polymer, flexible array, the upper substrate 22 can be a sheet of plastic (including PET and polycarbonate) that is coated with a thin film of ITO as the upper electrode 24.

The step of sealing 46 can be accomplished when the upper substrate 22 that carries the electrode 24 is attached to the polymer microcavity layer 18. The attachment can be accomplished, for example, with a thin film of epoxy adhesive around the circumference of the array 10, as illustrated in FIG. 3, exertion of some pressure and permitting the adhesive to cure. Alternative attachment methods include laser welding, ultrasonic welding, or clamping by the application of external force.

Figure 4:
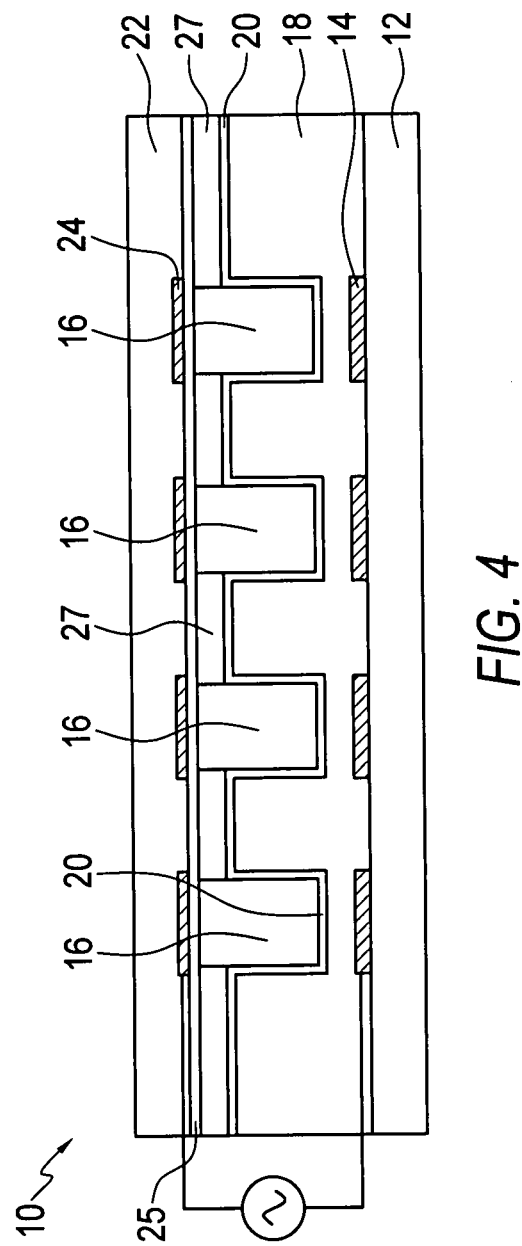
FIG. 4 is a cross-sectional schematic view of another preferred embodiment polymer microcavity plasma device array.

The bonding or other attachment can be accomplished such that the microcavities 16 are isolated from one another as illustrated in the array 10 of FIG. 1 where the adhesive layer 26 forms bonds around the circumference of the array 10 and seals regions between the microcavities 16. Alternatively, the upper substrate 22 that carries the upper electrode 24 can be intentionally separated by a short distance from the polymer microcavity layer 18, which allows gas to flow freely between the microcavities 16 or between groups of microcavities as in FIG. 3. Such an arrangement also increases the volume for discharge medium. This can be accomplished with patterns of adhesive, for example. For example, adhesive can be patterned only around an outer circumference of the polymer microcavity layer 18 so that, when bonded and sealed as illustrated in FIG. 3, the short distance of separation is maintained between the electrode 24 and the polymer microcavity layer 18 and the gas/gas mixture can flow freely between all of the microcavities. As another example, a pattern of adhesive can be patterned around the circumference and between groups of microcavities in the polymer microcavity layer 18 so that gas flow is possible within groups of microcavities, as illustrated in FIG. 4. In other cases additional support structures that separately support the substrate 12 and the substrate 22 to maintain the short distance of separation between the upper electrode 24 and the polymer microcavity layer 18 can be used.

In FIG. 4, the electrodes 14, 24 are patterned and addressable, and an additional layer 27 (e.g., glass, polymer, transparent ceramic materials) is used to permit or restrict flow between individual ones or groups of microcavities 16. The addressable electrodes 14, 24, for example, are patterned to permit application of different voltages to different ones/groups of microcavities, which can contain the same or different gas species.

Figure 5:
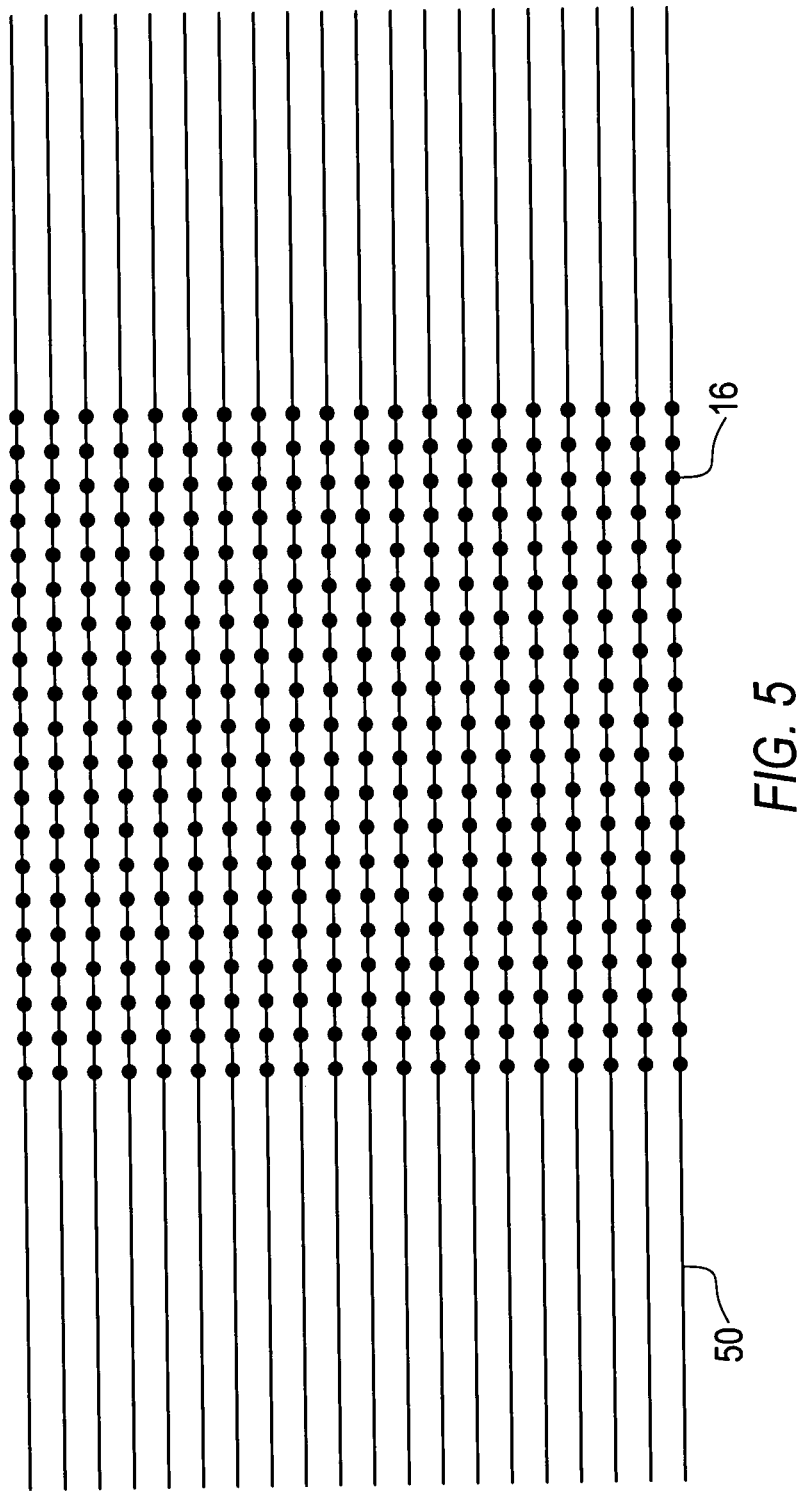
FIG. 5 is a schematic illustration of a microchannel and microcavity pattern for a preferred embodiment polymer microcavity plasma device array.

As illustrated in FIG. 5, another way to enable gas flow between groups of microcavities 16 is with the use of microchannels 50, which can be molded into the polymer layer 18 by the same fabrication methods discussed above. In FIG. 5, lines of microchannels 50 connect groups of microcavities 16. Gas flow is possible between connected groups of microcavities 16. Also, the microchannels 50 can be designed to allow gas or gas mixtures to be introduced into the polymer microcavity plasma device array from an external source, and multiple channels can be further configured to allow different gases or gas mixtures to be introduced separately to different regions of the polymer microcavity plasma device array.

The depth of the microchannels 50 can be either deeper, less deep, or the same depth as the microcavities 16 themselves. The microchannels 50 themselves can function as microplasma channels, emitting light in the regions between cavities, where the turn-on voltage of the microchannel 50 can be designed to occur at a voltage different from that required for the microcavities 16, so that different regions of the microchannel array can be activated selectively. Through the introduction of different gases into multiple regions of the microcavity plasma device array, sections of the array can emit light of different wavelengths. Through the mixture of emitted wavelengths from different regions of the array, a wide palette of visible emitted colors (or ultraviolet radiation, if desired) can be produced, where the observed color can be controlled through adjustment of the brightness from two or more microcavity plasma devices. Furthermore, one or more phosphors can be coated within all or selected ones/groups of the microcavities 16 to yield various colors of emitted light.

Because the emitted light spectrum is dependent upon electron excitation of atoms (or molecules) within the plasma, and because atoms and molecules each have a characteristic emission spectrum that is unique to the atomic and/or molecular components that are present, a gas sample that is introduced to the microcavity plasma device via a channel connected to an external gas source can be analyzed through measurement of the emitted spectrum. Further, the plasma generated in the microcavity plasma device can be subsequently directed by the microchannels 50 to the inlet of a mass spectrometer (MS) for detection of molecular fragments and elemental analysis.

Although this spectrometry method has previously been used with plasmas generated by other techniques, the present devices enable plasma generation with a compact, inexpensive, disposable device that is capable of generating multiple simultaneous plasmas from many individual gas flow streams, operating at atmospheric pressure. The latter characteristic, operation at atmospheric pressure, is advantageous because a vacuum system, which can be both expensive and bulky, is not necessary.

Figure 6:
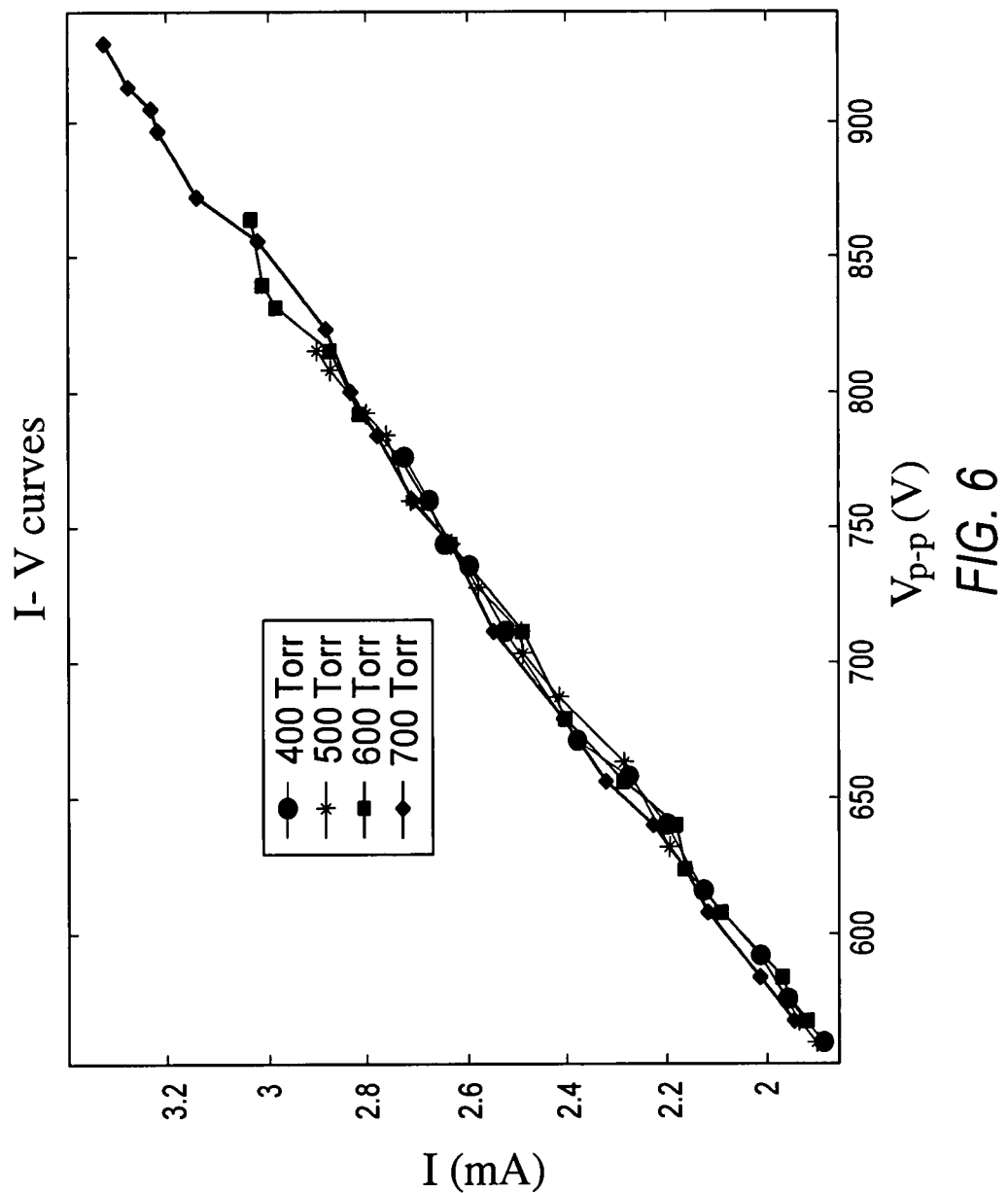
FIG. 6 shows I-V characteristics for an experimental 20×20 $cm^2$ array of 90×110 $\mu m^2$ cross-section microcavity plasma devices for Ne pressures between 400 and 700 Torr.

Experimental devices were formed. The cavity depth of the microcavities was 76 µm. Rows of cavities were connected with 20 µm wide microchannels in the pattern shown in FIG. 5. The microchannels and microcavities were filled with Ne gas, at a pressure of 600-700 Torr. A plasma turn-on voltage of 900 $V_{p-p}$ (318 V RMS) was measured, with an operating voltage of 560 V. The plasma within the gas channels is initiated at a higher voltage than the plasma with the microcavities themselves. I-V characteristics for a 20×20 cm$^2$ array of 90×110 µm$^2$ cross-section microcavity plasma devices are shown in FIG. 6 for Ne pressures between 400 and 700 Torr. The data in FIG. 6 were obtained by driving the array with a sinusoidal voltage at a frequency of 20 kHz. The "turn on" or ignition voltages range from 680 $V_{p-p}$ (240 V RMS) to 800 $V_{p-p}$ (283 V RMS). Regardless of the pressure, the slope of the characteristic is positive. This means that the array can be operated without the need for ballast, a substantial advantage for commercial applications.

Figure 7:
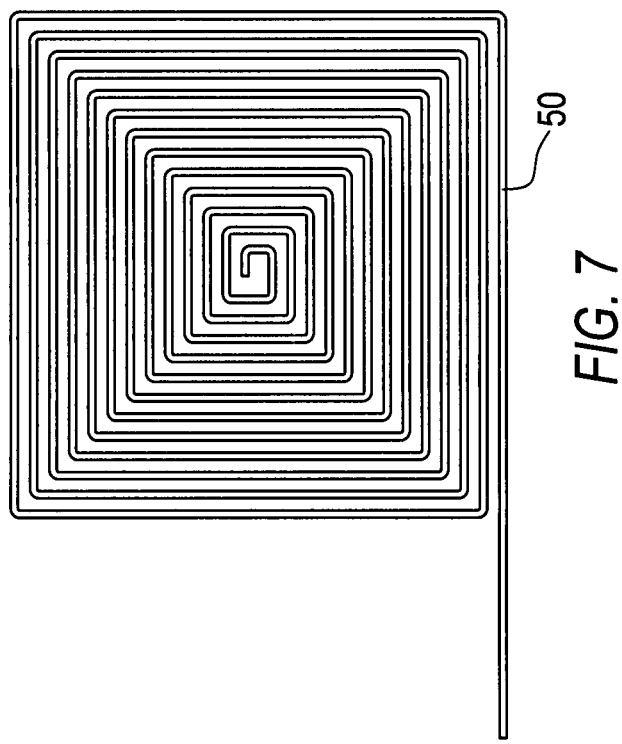
FIG. 7 illustrates a square spiral microchannel plasma device of the invention.

Another preferred embodiment microchannel plasma device is illustrated in FIG. 7. The device can have the electrode and substrate arrangements of FIGS. 1, 3 and 4, but plasma is excited in a microchannel 50 that has the shape of a square spiral. The square spiral microcavity and other patterns can be molded in the polymer layer 18 in the same manner discussed with respect to the preferred fabrication method of FIG. 2. An experimental device was formed having a microchannel in the shape of the square spiral of FIG. 7. The microchannel was 100 µm in width and was operated in Ne at 500 Torr. The entire square spiral produced a display. In addition to square spirals, round spirals have been fabricated. Generally, the molding of polymer microcavities and microchannels permits small feature sizes and precise relative positioning of features.

Preferred fabrication methods of the invention also permit high volume manufacturing. For example, microcavities and connecting microchannels can be formed by the mold replication method, which allow for large arrays to be produced by roll-to-roll processing, for example. Consequently, large arrays can be produced inexpensively.

There are many applications for transparent microcavity plasma device arrays and microchannel plasma devices of the invention. In addition to improving plasma display panels and other display technology in general, and providing for the applications discussed in the background, completely transparent devices of the invention have wider applicability. For example, flexible, transparent displays can be of value for heads-up displays in automobiles and in retail applications. Lightweight video displays are another application because the preferred molding process allows for pixels of much smaller size than those reported in the example prototypes discussed above to be fabricated.

Figure 8:
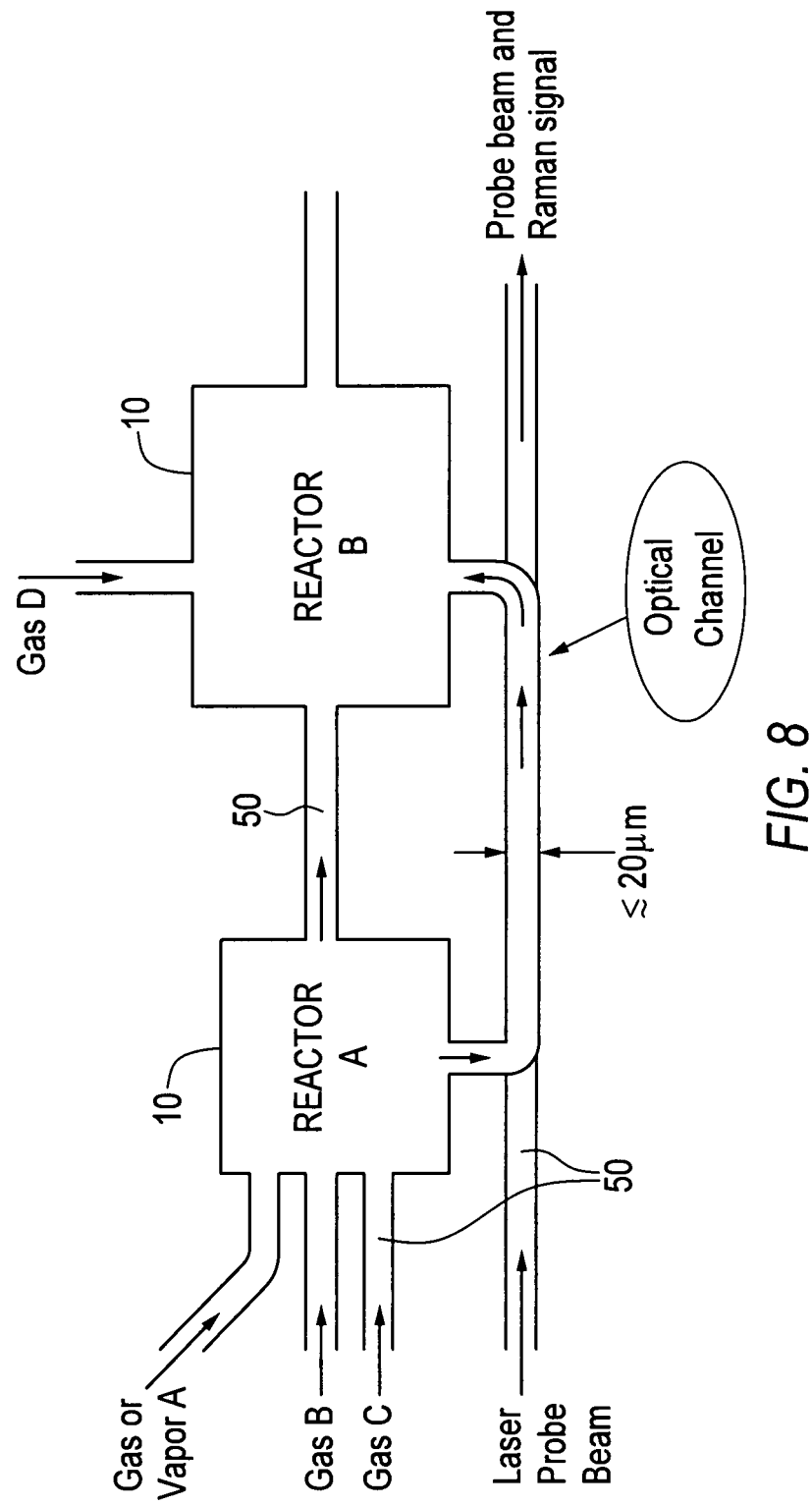
FIG. 8 is a schematic diagram of a microcavity plasma device array reactor and microchannel flow probing channel of the invention for use in a spectrometry system.

Another exemplary application is to chemical microreactors and optical diagnostics. FIG. 8 is a schematic diagram of a simple microreactor system in which one or more gases (or vapors) are introduced to a microplasma device array 10 of the invention denoted as reactor A. The initiation of a microplasma within reactor A effects a desired chemical reaction and the chemical product(s) can be transported to a second microplasma device array 10 (reactor B) for further processing in which an additional gas (GAS D) interacts with the products of reactor A. It is clear that this process can be continued as desired and as many (or few) gases introduced to each reactor as desired. Furthermore, the small size of the connecting channels that can be readily fabricated make such structures ideal for optical diagnostics of the chemical products. The device array of FIG. 5, for example, can have connecting channels with a cross-sectional dimension of 20 μm, which is approaching the diameter of single mode waveguides in the visible. Therefore, the product stream emerging from reactor A in FIG. 8, for example, can be probed by laser spectroscopy in a channel as shown. The laser beam is introduced from the left and interacts with the product stream. One has the option of producing a plasma (in addition to that in reactor A) in the optical channel or not. The interaction of the laser radiation (more than one incident wavelength may also be used) with the product stream produces an optical signal such as that generated by Raman scattering, from which one can determine the products from reactor A and the efficiency of the chemical reactions. The optical channel can be fabricated such that a thin polymer wall separates the optical channel (containing the products of reactor A) from the channel through which the laser probe beam propagates through the microplasma array.

Figure 9:
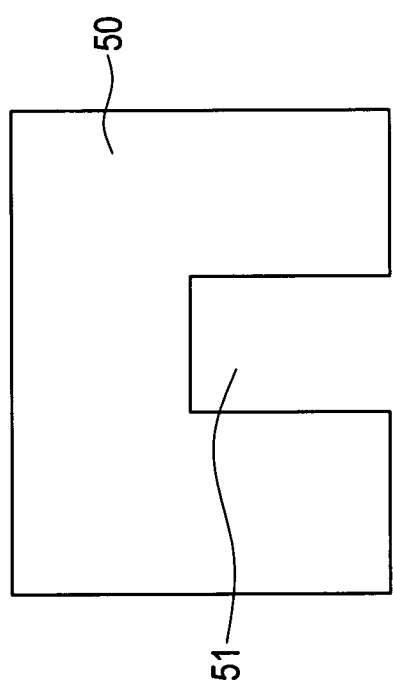
FIG. 9 is a schematic diagram illustrating the cross-section of an example embodiment microchannel for a plasma device of the invention.

FIG. 9 illustrates the cross-section of a microchannel 50 according to another embodiment. The cross-section in FIG. 9 can be used for a stable optical waveguide. A rectangular cross-section, when filled with a discharge medium (gas or gas mixture) cannot be strictly considered to be a stable optical waveguide because the index of refraction of the discharge medium is smaller than that of the polymer comprising the walls of the microchannel 50. While a rectangular or circular cross-section channel will be suitable for many applications, including spectroscopic system applications, a polymer rib 51 in the channel 50 of FIG. 9 provides a stable optical waveguide.

Figure 10:
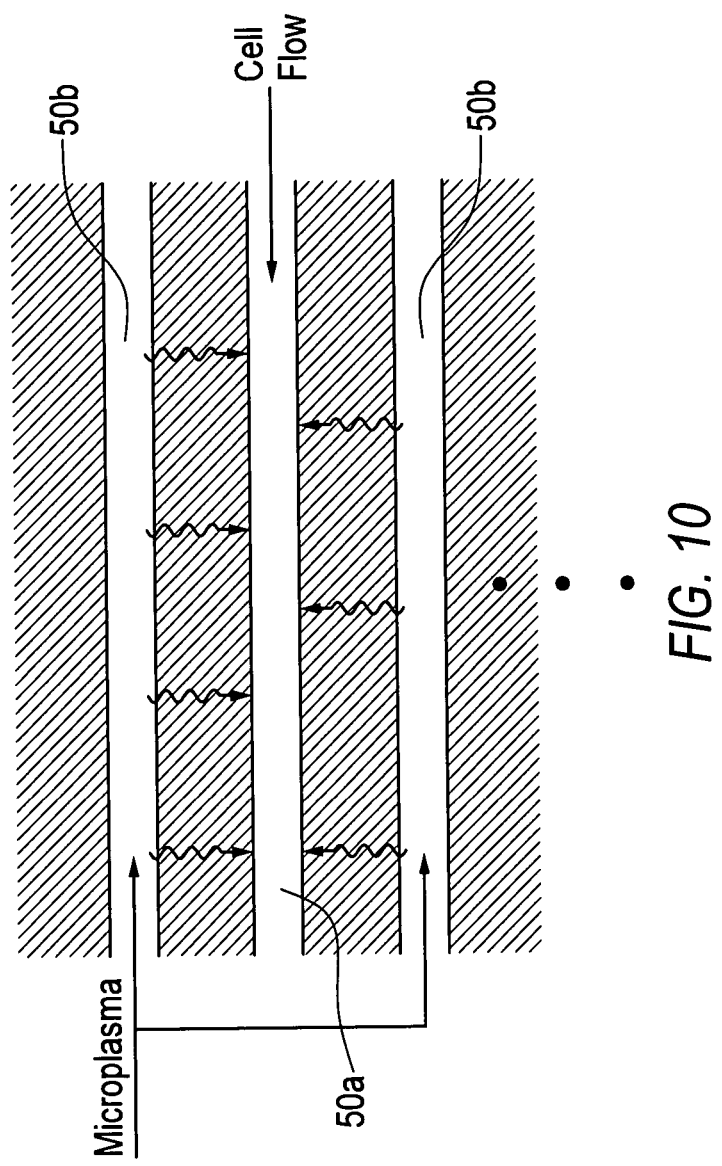
FIG. 10 is a schematic diagram of a microchannel plasma device for flow cytometry.

Another exemplary application is in cell sorting, or flow cytometry is shown in FIG. 10. Parallel channels fabricated by the processes described earlier, as shown in FIG. 5 for example (with or without microcavities), can be configured to operate such that every other microchannel row contains a plasma producing light of a desired wavelength. The substrate is chosen such that the light produced in the plasma microchannels 50 is transmitted through a thin region of substrate material and enters a flow channel 50a disposed between, or in close proximity to, the plasma channels 50b. Through this flow channel 50a, cells flow in a liquid stream. The cells may be "tagged" with a chromophore such that light from the plasma channels results in the emission of fluorescence from the cells. The wavelength, or range of wavelengths, emitted provide information as to the nature of the cell.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

The invention claimed is:

1. A microplasma device, comprising:
a substrate consisting of flexible material;
a flexible polymer material layer supported by said substrate, said polymer material layer having one of at least one microchannel or at least one microcavity defined within the volume of said polymer material layer and penetrating only a single surface of said polymer material layer;
a plasma medium confined by said at least one microchannel or at least one microcavity defined within the volume of said polymer material layer;
electrodes arranged with respect to said polymer material for exciting a plasma in said plasma medium.

2. The device of claim 1, wherein said polymer material layer comprises a transparent polymer material in visible and near UV.

3. The device of claim 1, further comprising a dielectric coating on surfaces of said at least one microchannel or at least one microcavity to protect said polymer material layer from the plasma.

4. The device of claim 1, wherein said polymer material layer is an epoxy.

5. The device of claim 1, wherein said polymer material layer comprises a UV curable polymer.

6. The device of claim 1, wherein said one of at least one microchannel or at least one microcavity comprises a plurality of microcavities.

7. The device of claim 1, wherein said one of at least one microchannel or at least one microcavity comprises a plurality of microcavities and at least one microchannel connecting said plurality of microcavities.

8. The device of claim 1, wherein said electrodes are isolated from said plasma medium.

9. The device of claim 1, wherein said electrodes comprise patterned electrodes for independently addressing ones or groups of microcavities or microchannels.

10. The device of claim 1, wherein:
a first one of said electrodes is carried by said substrate:
said polymer material layer is upon said first one of said electrodes, and a thin portion of said polymer material layer separates said one of at least one microchannel or at least one microcavity from said first one of said electrodes;
a dielectric coating on surfaces of said at least one microchannel or at least one microcavity protects said polymer material from the plasma;
a second one of said electrodes is carried by a second substrate; and
the second one of said electrodes and said second substrate are held by adhesive proximate to said polymer material.

11. The device of claim 10, wherein said adhesive comprises a patterned layer of adhesive.

12. The device of claim 1, wherein said one of at least one microchannel or at least one microcavity is at least one microcavity having one of a constant rectangular or circular cross section throughout its entire depth.

13. The device of claim 1, wherein said at least one microchannel or microcavity has substantially vertical sidewalls throughout the height of the sidewalls.

14. The device of claim 1, wherein the device as a whole is flexible and lacks any rigid substrates.

15. A microplasma device, comprising:
a substrate;
a polymer material layer supported by said substrate, said polymer material layer having one of at least one microchannel or at least one microcavity defined by and within the volume of said polymer material layer and penetrating only a single surface of said polymer material layer;
a plasma medium confined by and occupying an entire volume defined by said at least one microchannel or at least one microcavity defined within the volume of said polymer material layer;

electrodes arranged such that the volume of said at least one microchannel or at least one microcavity is aligned with and between the electrodes for exciting a plasma in said plasma medium.

16. The device of claim 15, wherein one of said electrodes is separated from the volume defined by said at least one microchannel or one microcavity by a thin portion of said polymer material layer.

17. A microplasma device, comprising:
a fist substrate;
a polymer material layer supported by said substrate, said polymer material layer having one of at least one of a plurality of microchannels or plurality of microcavities defined by and within the volume of said polymer material layer and penetrating only a single surface of said polymer material layer;
a plasma medium confined by and occupying an entire volume defined by said at least one of a plurality of microchannels or a plurality of microcavities defined within the volume of said polymer material layer;
electrodes such that the volume defined by said at least one of a plurality of microchannels or at least one of a plurality of microcavities is aligned with and between the electrodes for exciting a plasma in said plasma medium; and
a second substrate that individually and separately seals said plasma medium into each one of said plurality of microchannels or plurality of microcavities.

18. The device of claim 17, wherein one of said electrodes is separated from the volume defined by said at least one of a plurality of microchannels or one of a plurality of microcavities by a thin portion of said polymer material layer.

* * * * *